(12) United States Patent
Ries

(10) Patent No.: US 9,779,482 B2
(45) Date of Patent: Oct. 3, 2017

(54) IMAGE RASTER ROTATION

(71) Applicant: Optis Circuit Technology, LLC, Plano, TX (US)

(72) Inventor: Gilles Ries, Saint-Jean de Moirans (FR)

(73) Assignee: OPTIS CIRCUIT TECHNOLOGY, LLC, Plano, TX (US)

( * ) Notice: Subject to any disclaimer, the term of this patent is extended or adjusted under 35 U.S.C. 154(b) by 182 days.

(21) Appl. No.: 14/782,013

(22) PCT Filed: Apr. 14, 2014

(86) PCT No.: PCT/EP2014/057547
§ 371 (c)(1),
(2) Date: Oct. 2, 2015

(87) PCT Pub. No.: WO2014/173722
PCT Pub. Date: Oct. 30, 2014

(65) Prior Publication Data
US 2016/0063680 A1    Mar. 3, 2016

(30) Foreign Application Priority Data

Apr. 24, 2013 (EP) .................................. 13305540

(51) Int. Cl.
*H04N 9/74* (2006.01)
*G06T 3/60* (2006.01)
(Continued)

(52) U.S. Cl.
CPC ................. *G06T 3/60* (2013.01); *G09G 5/39* (2013.01); *G09G 5/395* (2013.01); *G09G 2340/0492* (2013.01)

(58) Field of Classification Search
CPC .......... G06T 3/60; G09G 5/395; G09G 5/393; G09G 2340/0492
See application file for complete search history.

(56) References Cited

U.S. PATENT DOCUMENTS 6,819,334 B1  11/2004  Owada et al.
7,307,635 B1  12/2007  Yang et al.
(Continued)

FOREIGN PATENT DOCUMENTS

WO    2005/083672 A2    9/2005

OTHER PUBLICATIONS

International Search Report issued in corresponding International application PCT/EP2014/057547, date of completion of the International search, Jun. 16, 2014.
(Continued)

*Primary Examiner* — Tapas Mazumder
(74) *Attorney, Agent, or Firm* — The Danamraj Law Group, P.C.; Thomas L. Crisman; Kenneth A. McClure

(57) ABSTRACT

A method allows changing an image raster direction from an application raster direction to a screen raster direction, in-flight while pixel values of an image are transferred successively from an application output memory to a display unit. A single buffer memory array is implemented between the application output memory and the display unit. Two writing orders for cells of the buffer memory array are used in turn, each being combined with a different reading order for the cells. The method can be hardware-implemented, and is adapted for burst-handling of the pixel values.

12 Claims, 7 Drawing Sheets

(51) Int. Cl.
G09G 5/39 (2006.01)
G09G 5/395 (2006.01)

(56) References Cited

U.S. PATENT DOCUMENTS

2006/0238541 A1* 10/2006 Toni .................. G06T 3/602
 345/531
2007/0139445 A1 6/2007 Khan et al.
2011/0227937 A1* 9/2011 Todorovich ............ G06F 3/147
 345/545
2011/0298982 A1* 12/2011 Kobayashi ............... G06T 3/40
 348/581

OTHER PUBLICATIONS

Written Opinion of the International Searching Authority issued in corresponding International application No. PCT/EP2014/057547, date of mailing, Jun. 24, 2014.
Extended European Search Report issued in corresponding European application No. 13 30 5540, date of issue, Jul. 24, 2013.

* cited by examiner

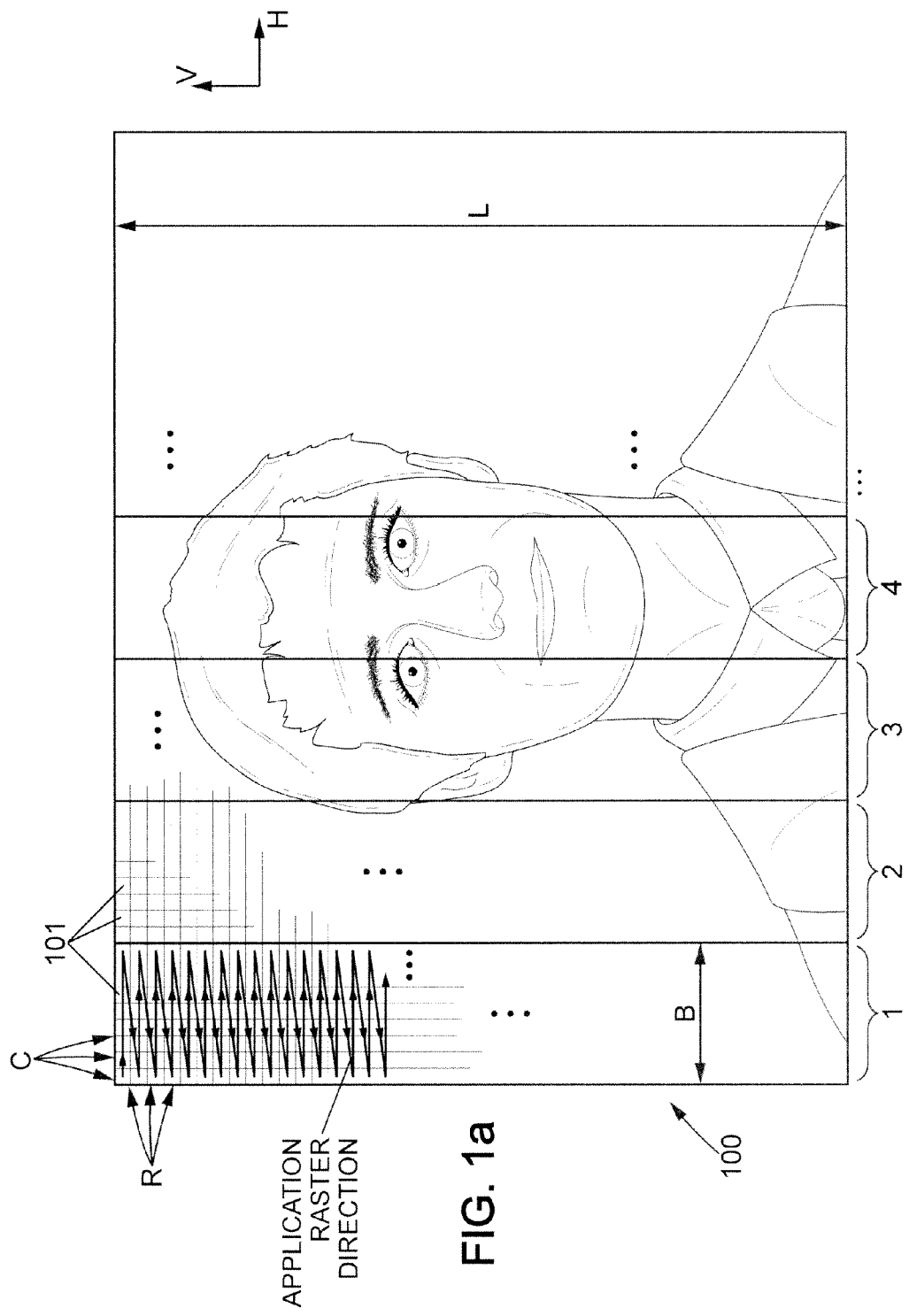

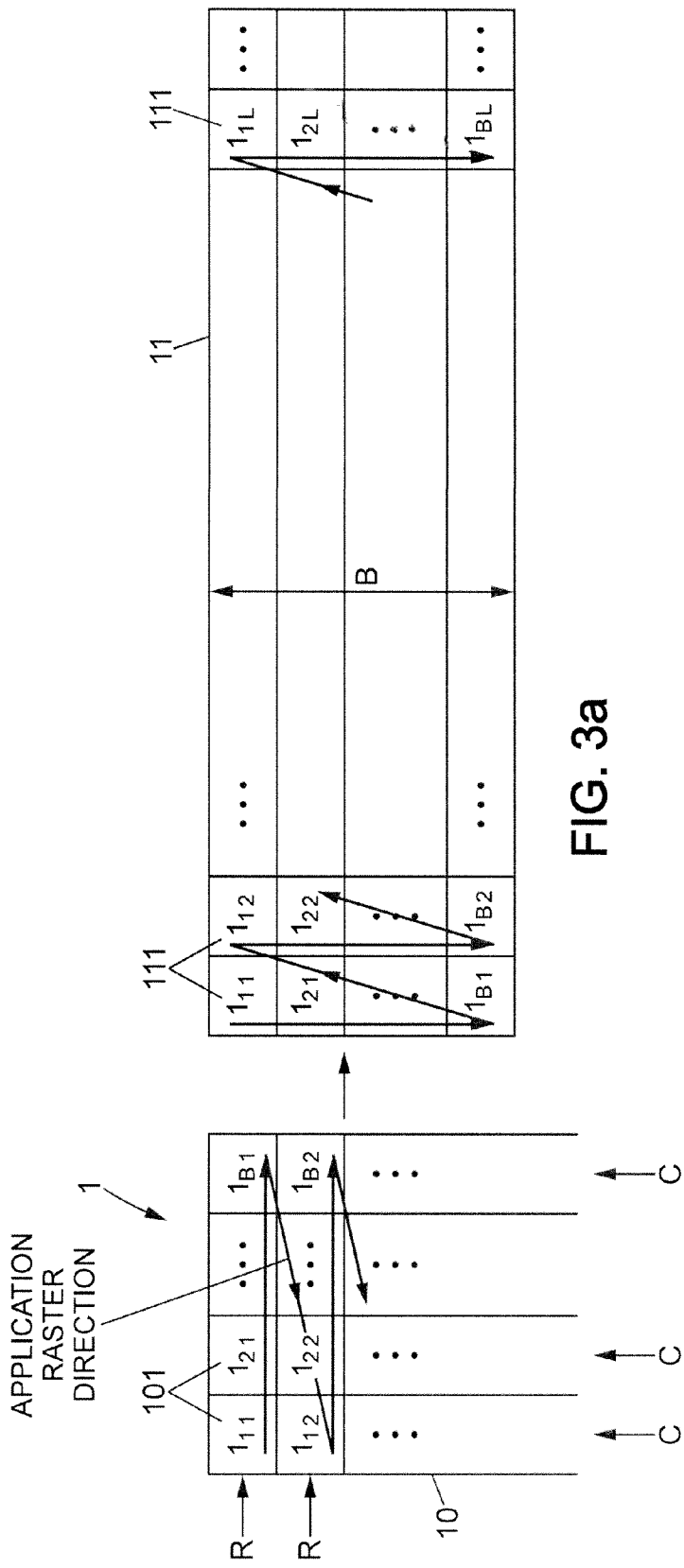

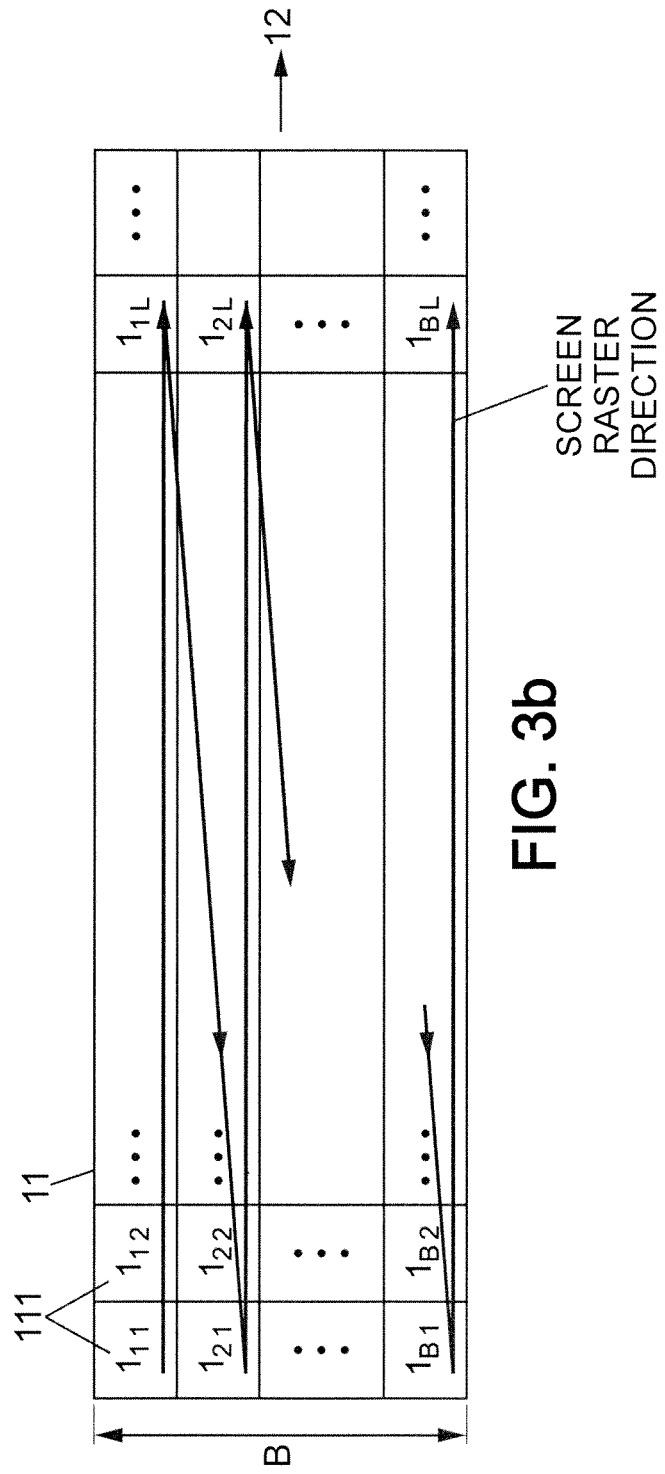

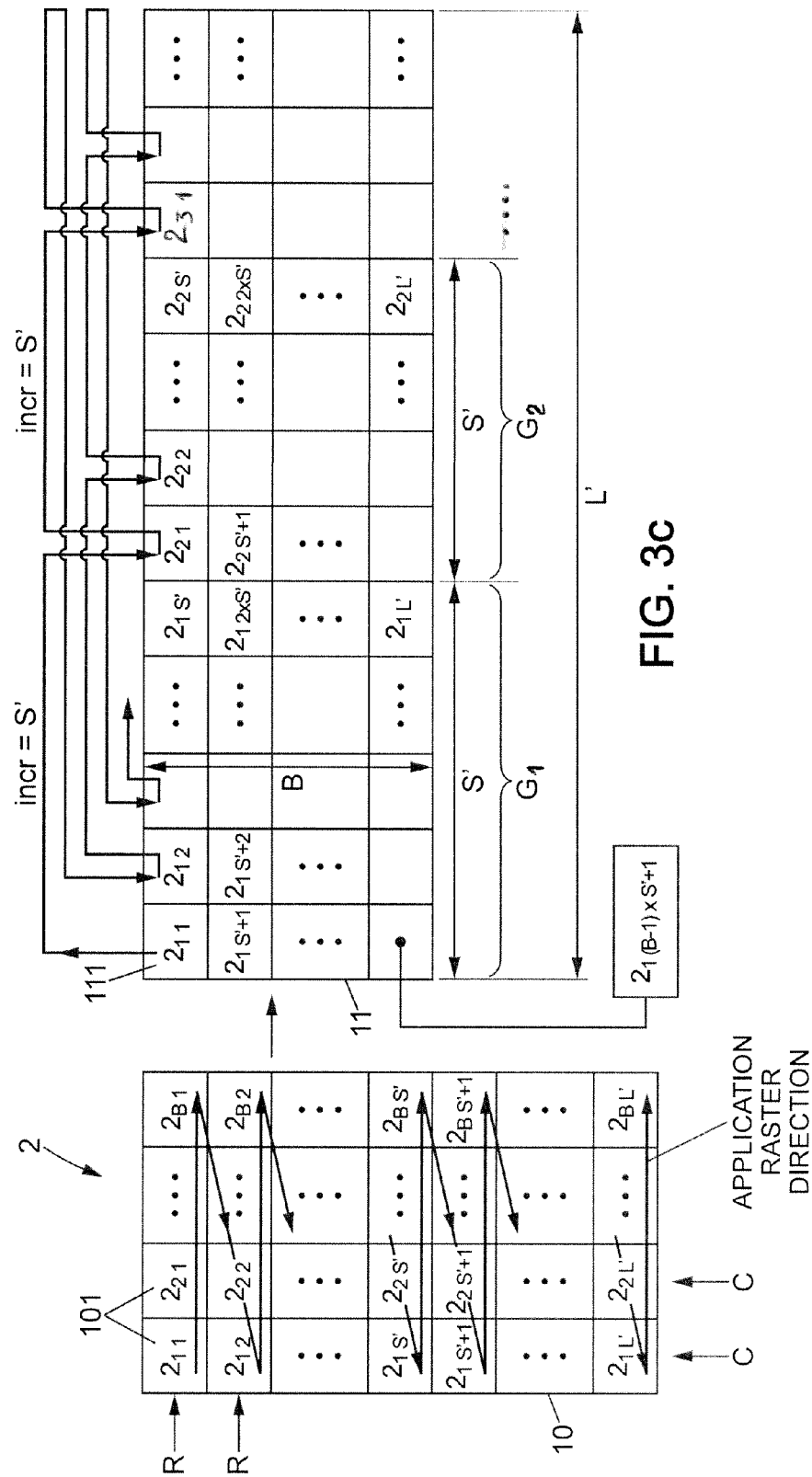

IMAGE RASTER ROTATION

The invention relates to a method for rotating a raster direction of an image to be displayed, and to an integrated circuit designed for implementing such method.

BACKGROUND OF THE INVENTION

The invention may be implemented within electronic devices such as computers, mobile terminals, etc, which are each equipped with a display unit. Images are usually produced by software applications according to a raster direction which is determined by each application itself. Then, the images are to be displayed using a screen raster direction which may be different from the raster direction of the images as produced by the application. For example, the screen may be soldered within an electronic device with fixed screen raster direction, e.g. along image column direction, whereas the raster direction of the images as-produced by the application may be different, e.g. along image line direction. Other situations where the application raster direction and the screen raster direction may be different from each other appear when the electronic device may be changed in orientation, and the image is rotated in accordance with the device orientation for the image to appear always with top upwards. In all cases, the image rotation is required to be as fast as possible, in particular when the image rotation is triggered automatically upon detecting a rotation of the electronic device.

A basic approach is to perform a rotation while recopying the buffer from one memory location to another. It is however very costly in terms of bandwidth. A more optimal and common method is to perform an in-flight rotation: such image raster rotation consists in providing two buffer memory arrays which allow in-flight raster rotation during the transfer of each image from an application output memory to the display unit. Both buffer memory arrays are implemented in parallel in a ping-pong mode between an image-writing sequence and an image-reading sequence. For example, each image is output by the application according to horizontal raster direction, and is to be fed into the display unit according to vertical raster direction. In the whole description hereafter, horizontal direction and vertical direction refer to the image itself based on its image content. A next image or image strip is loaded into one of the buffer memory arrays while a former image or image strip previously loaded into the other buffer memory array is being currently transferred from this latter buffer memory array to the display unit. Both loading and transferring sequences are performed simultaneously and independently from each other, using separately both memory buffer arrays in turn. Both buffer memory arrays are swapped between loading an image or image strip from the application output memory and then transferring this image or image strip to the display unit. The scanning order of each image is the application raster direction for loading the image into one of the buffer memory arrays, whereas the scanning order which is used for transferring each image to the display unit is the screen raster direction. Therefore such in-flight image raster rotation requires two memory buffer arrays. Such pair of memory buffer arrays may be embedded in the circuit silicon for high speed operation. But, the implementation of two memory buffer arrays requires a doubled silicon area within the integrated circuit, which causes cost increase as a consequence.

Document U.S. Pat. No. 7,307,635 discloses another method for performing image raster rotation during the transfer from the application output memory to the display unit. This other method requires only one intermediate buffer memory which is of line memory type. The pixel values of a first image strip are loaded into the line buffer memory according to the image pixel order set by the application raster direction. Then, the pixel values are transferred to the display unit according to the screen raster direction, and once a pixel value of the first image strip has been transferred from a memory cell of the line buffer memory to the display unit, another pixel value pertaining to a next image strip is loaded into the same memory cell. But the successive loading sequences of image strips to the line buffer memory and the transferring sequences from the line buffer memory are carried out using variable offsets for the cell positions within the line buffer memory. These offsets must be calculated again for each new image strip which is handled, and such calculation is quite complicated for being implemented at hardware level.

In addition, successive loadings of pixel values into the buffer memory line do not relate to adjacent memory cells, which does not allow burst-handling of the pixel values. Similar incompatibility with burst-handling also appears for the transfer of the pixel values from the buffer memory line to the display unit. As a consequence, for transferring N pixel values from the application output memory to the display unit, the method of document U.S. Pat. No. 7,307,635 requires N separate accesses to the buffer memory for pixel value writing and also N additional separate accesses for pixel value reading. Because of this, the buffer memory line must be of a dual port memory type, which is more expensive and complicated to implement.

Starting from these existing solutions, one object of the present invention consists in proposing a new method for changing an image raster direction, which requires a single buffer memory.

A further object of the invention is that the buffer memory is limited in size so that it can be silicon-embedded within an integrated circuit without much cost increase.

Still another object of the invention is that the buffer memory can be of single port memory type.

Still another object of the invention consists in proposing a method for changing an image raster direction, which is easy to implement. In particular, the invention method does not involve complex calculation of offset values for selecting the cells of the buffer memory in which writing and reading operations are to be executed.

Then, a further object of the invention is that a controller used for controlling the execution of the invention method can be also silicon-embedded. Put another way, the controller can be hardware-implemented.

Still another object of the invention is that the invention method is compatible with burst-handling of the image pixel values.

SUMMARY OF THE INVENTION

In order to meet at least one of these objects or others, a first aspect of the invention proposes a method for changing an image raster direction from an application raster direction to a screen raster direction which is perpendicular to the application raster direction, in-flight while pixel values of an image are being transferred successively from an application output memory to a display unit.

The image is divided into parallel image strips which are successively transferred, each image strip having a length direction perpendicular to the application raster direction, a strip length and a strip width expressed in pixel numbers.

Each image strip is read from the application output memory according to the application raster direction and loaded into a buffer memory, and then transferred from the buffer memory to the display unit according to the screen raster direction.

A writing order is used for selecting the cells of the buffer memory where the pixel values which pertain to a same image strip are written successively. Additionally, a reading order is used for selecting the cells of the buffer memory where the pixel values pertaining to a same image strip are read successively. These writing and reading orders are varied between two image strips which are transferred successively.

The invention method has the following additional features:
- the buffer memory is a memory cell array, with a buffer width which is at least equal to the strip width, and a buffer length which is at least equal to both the strip length and a multiple of the strip width; and
- only two writing orders different from each other are used, and only two reading orders different from each other are also used, the two writing orders being combined one-to-one and fixedly with the two reading orders for processing the image strips individually, and both writing orders each combined with the corresponding reading order being used in turn for image strips which are transferred successively.

Hence, a method according to the invention only requires one buffer memory, which is limited in size. Therefore, such buffer memory may be silicon-embedded without causing a significant cost increase for an integrated circuit which implements the method. The execution of the method can then be very fast. Preferably, the buffer width may be equal to the strip width, and the buffer length may be the minimum multiple of the strip width, which is also equal to or higher than the strip length. This sizing of the buffer memory is minimum but compatible with the invention.

The invention method only involves two writing orders and two reading orders. These writing- and reading orders are thus very limited in number, so that they can be easily hard-implemented and hard-controlled within a silicon integrated circuit In addition, a method according to the invention is adapted for handling the pixel values burst-wise, in particular when the strip width is equal to or multiple of a burst length. Then, the pixel values may be burst-read from the application output memory and burst-written into the cells of the buffer memory at least for the image strips which are processed using a fixed one of the writing orders. Independently or in combination, the pixel values may be burst-transferred from the buffer memory to the display unit at least for the image strips which are processed using a fixed one of the reading orders.

Possibly, a time duration between a writing operation of one pixel value into any one of the buffer memory cell and a later reading operation of this pixel value from the same buffer memory cell may be less than a duration of a base sequence comprising one cell-writing and one cell-reading into the buffer memory, multiplied by the strip length when cell-writing and cell-reading into the buffer memory are executed in turn during a continuous run of the invention method.

Assuming that the array of the buffer memory is arranged into lines each having the buffer length, and also into columns each having the buffer width, and each buffer memory cell being identified with a column number and a line number, and assuming that S' denotes the ratio of the image length to the image width, rounded-up to next integer, an advantageous implementation of the invention has the following features:
- in a first one of the two writing orders: the buffer memory cells are addressed to for writing the pixel values by moving first progressively along one and same first column of the buffer memory for the successive pixel values relating to one and same first image segment parallel to the image strip width direction, and then moving to a next buffer memory column adjacent to the first buffer memory column for writing the pixel values relating to a next image segment also parallel to the strip width direction and adjacent to the first image segment;
- in the reading order which is combined with the first writing order for processing same image strips: the buffer memory cells are addressed to for reading the pixel values by moving first progressively along one and same first line of the buffer memory, and then moving to a next buffer memory line adjacent to the first buffer memory line;
- in the second one of the two writing orders: the buffer memory cells are addressed to for writing the pixel values by moving first along one and same first line of the buffer memory together with shifting cell position by S' cells between two successive pixel values relating to one and same first image segment parallel to the image strip width direction, then repeating for the pixel values relating to a next image segment also parallel to the strip width direction and adjacent to the first image segment, using the same first line of the buffer memory but shifting the cell positions by one cell for each further image segment, and then moving to a next buffer memory line adjacent to the first buffer memory line for writing the pixel values relating to a further image segment also parallel to the strip width direction but shifted in position by S' pixels along the strip length direction with respect to the first image segment;
- in the reading order which is combined with the second writing order for processing same image strips: the buffer memory cells are addressed to for reading the pixel values by moving first progressively along one and same first line of the buffer memory until the S'-th cell of this first buffer memory line, and then moving to a next buffer memory line adjacent to the first buffer memory line again until the S'-th of this next buffer memory line, then repeating for each buffer memory line and further repeating but back to the first buffer memory line while shifting in cell position by S' cells along the line direction.

Such implementation is advantageous in particular because adjacent cells of the buffer memory are addressed to successively at several times during the method. This allows burst-handling of the pixel values, which leads to easier and faster executions of the method. Then, the buffer memory used for implementing the present invention may be of a single port memory type.

A second aspect of the invention proposes an electronic device which comprises:
- a computing unit, which is adapted for outputting images when running an application, strips of each image being available from an application output memory in accordance with an application raster direction;
- a display unit, which is adapted for being fed with image pixel values according to a screen raster direction;
- a buffer memory, which is comprised of a memory cell array, with a buffer width at least equal to the strip width, and a buffer length at least equal to both the strip length and a multiple of the strip width; and a controller, which is adapted for implementing a method as described above for changing an image raster direction.

Such electronic device may form one of a mobile phone, a tablet, and a portable videogame console, or any electronic device that may require the rotation of its display.

In preferred embodiments of the second invention aspect, the following improvements may be implemented separately or in combination of several of them:

the buffer memory may be silicon-embedded within an integrated circuit of the device; and the controller may also be silicon-embedded within the integrated circuit;

the electronic device may be adapted for triggering a change of the image raster direction automatically upon detection of a change in an orientation of the electronic device.

BRIEF DESCRIPTION OF THE DRAWINGS

FIGS. 1a and 1b show two raster directions for scanning an image displayed;

FIGS. 3a to 3d illustrate a method according to the invention for transferring successively two image strips along a chain as represented in FIG. 2.

DETAILED DESCRIPTION OF THE INVENTION

In these figures, same reference numbers denote same elements or elements with similar functions. Also, the image and screen raster directions shown in these figures are only for exemplifying purpose, and may be exchanged while maintaining their relative arrangements. In addition, the invention principles which are described hereafter may also be applied while inverting the moving orientation along one or several directions involved.

Figure 1B:
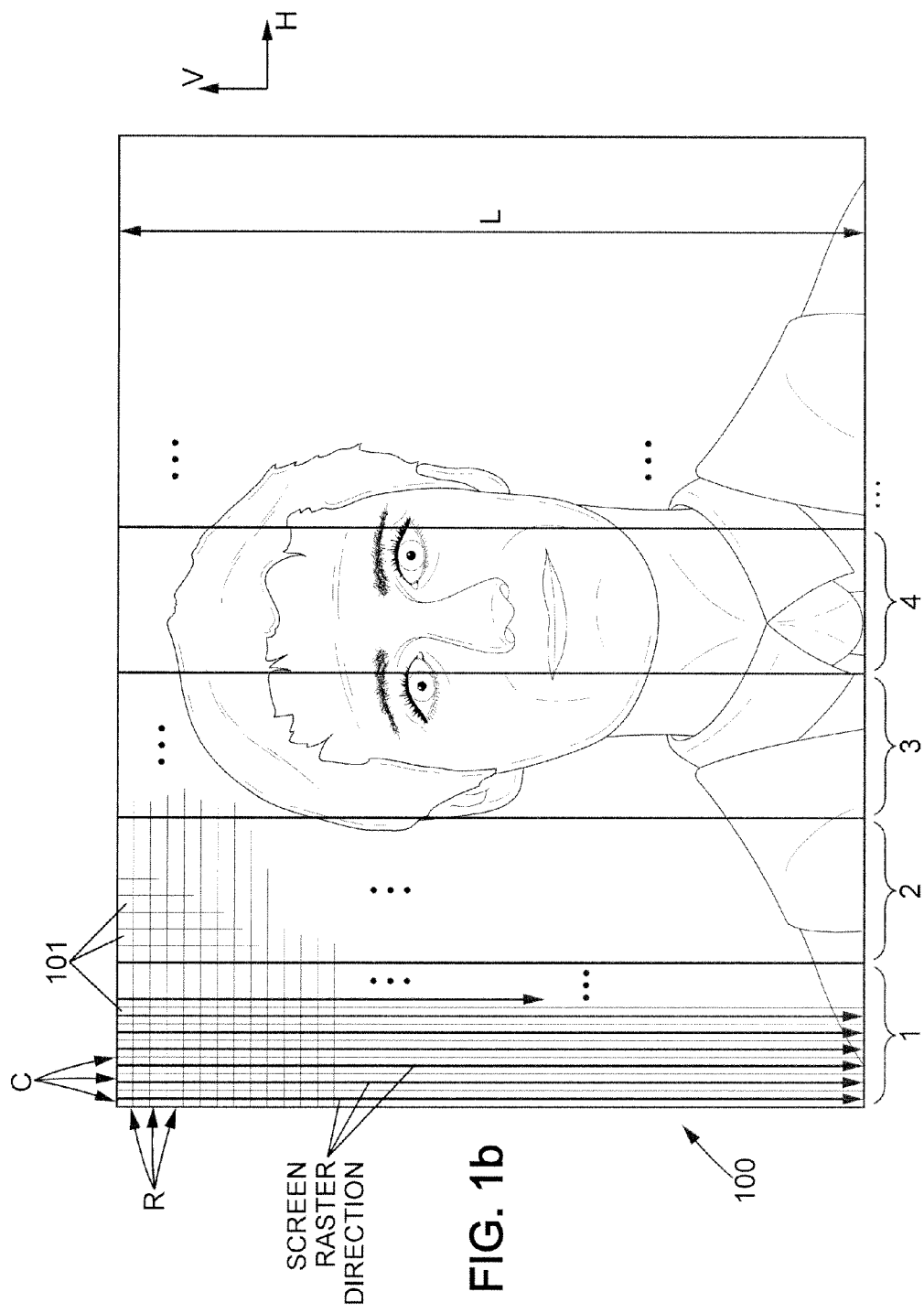

FIGS. 1a and 1b show one and same image with two raster directions. Reference number 100 denotes the image as a whole. The image content (a human face for illustrative purpose) determines a vertical image direction V and a horizontal image direction H. The image 100 is comprised of pixel values respectively assigned to pixels 101 each located at a crossing of one column C extending along the vertical direction V and one line R (row) extending along the horizontal direction H. For example, the image 100 may be comprised of 1920 lines R.

The image 100 is issued by a software application running on any computing unit. The application outputs the pixel values which are assigned respectively to the pixels 101 by scanning all the image pixels according to a fixed raster mode determined by the application itself. Commonly but not necessarily for the invention, the image 100 may be divided into adjacent strips 1, 2, 3, 4 . . . and the application raster mode is applied within each strip. Then, the strips are handled successively, each after one another. For example as shown in FIG. 1a, the pixels 101 may be first scanned along the line direction within each image strip, and then moving to the next line within the same image strip once the strip boundary has been reached. The raster direction so-implemented is the image line direction. Alternatively, the pixels 101 may be first scanned along the image column direction within each strip 1, 2, 3, 4 . . . . In this alternative case shown in FIG. 1b, the raster direction is the image column direction.

For the invention, a strip length direction as fixed by the application is supposed to be perpendicular to the application raster direction. Namely, the strips 1, 2, 3, 4 . . . have a length value L along the strip length direction and a width value B along a strip width direction which is perpendicular to the strip length direction. The length value L is greater that the width value B, when both are expressed as pixel numbers. The length direction may be either the column direction or the line direction for the image, and the width direction is then the other one of the column direction and length direction. The image strips are then juxtaposed along the strip width direction. In FIG. 1a where the application raster direction is the image line direction, the strip length direction is the image column direction. Then the strip length value L is 1920 pixels in the example considered.

Commonly, the strip width value B may be selected so that all the respective pixel values of the pixels 101 which pertain to one and same line segment or column segment across the strip width can be handled and transferred in a gathered manner called burst. More specifically, the strip width value B may be equal to the burst length, or may be a multiple of this latter. Combining such burst-handling with the method of the invention leads to higher efficiency and faster execution of the raster direction rotation. For example, the strip width value B may be 64 pixels.

Figure 2:
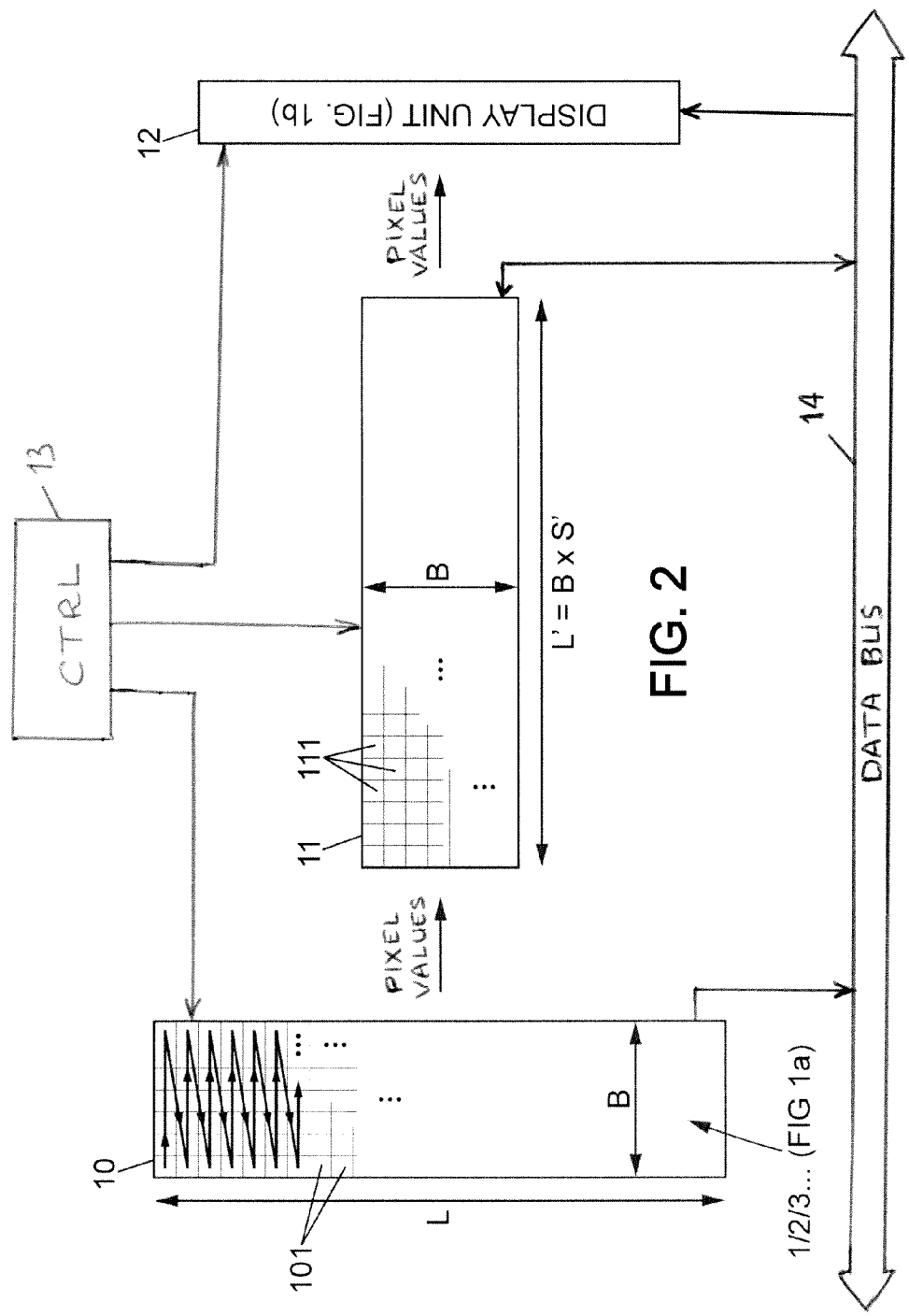
FIG. 2 illustrates schematically a chain as provided by the present invention for transferring images issued by an application to a display unit.

In FIG. 2, reference number 10 denotes an application output memory of the computing unit which runs the application. The application output memory 10 may be a Synchronous Dynamic Random Access Memory of Double-Data-Rate type, or DDR-SDRAM. The image strips are successively available in the application output memory 10. To this purpose, the application output memory 10 may be a memory cell array with L lines and B columns so that it can contain simultaneously all the pixel values of one and same image strip 1, 2, 3 . . . as produced by the application. As a matter of principle for transferring the image strips as they are progressively issued by the application, the pixel values are to be read in the application output memory 10 in accordance with the application raster direction. In the description hereafter, but for illustrative purpose only, we will suppose that this application raster direction is that one shown in FIG. 1a.

Reference number 12 denotes the display unit used for displaying the images issued by the application. Due to the own structure and operation of the display unit 12, and also its connection mode, the image strips 1, 2, 3 . . . are to be fed to the display unit 12 each according to the screen raster direction. In the example described, this screen raster direction is that shown in FIG. 1b.

According to the invention, the electronic device is provided with a buffer memory 11, which is intermediate between the application output memory 10 and the display unit 12 in the transfer chain of the images from the application output memory 10 to the display unit 12. The buffer memory 11 is of array type, with dimensions in memory cell numbers at least equal to the dimensions of the application output memory 10. Thus, the width of the buffer memory 11 is greater than or equal to B. In case it is greater than B, the useful width is B so that cell lines of the buffer memory 11 beyond the B first ones are not used. Therefore, we can assume from now on that the width of the buffer memory 11 is B pixels.

The buffer memory 11 is provided so that its array length L' equals the product of B and S', where S' is the minimum integer so that L' is equal to or greater than the length value L of the image strips which are issued in the application output memory 10. Put another way: S'=rounded-up (L/B) and L'=S'×B. In this way, the length L' of the array of the memory buffer 11 is multiple of its width value B. When L equals 1920 pixels and B equals 64 pixels, then S' may equal 31 and L' equals 1984. In the array of the buffer memory 11, lines and columns are so oriented that the line length is L' memory cells and the column length is B memory cells.

Reference numbers 101 and 111 respectively denote the memory cells of the application output memory 10 and the buffer memory 11.

Reference number 13 denotes a controller suitable for controlling at least the cell-reading operations into the application output memory 10, the cell-writing and reading operations into the buffer memory 11, and the pixel value transfer to the display unit 12.

Reference number 14 denotes a data bus used for transferring the pixel values between the application output memory 10, the buffer memory 11 and the display unit 12.

FIGS. 3a to 3d illustrate respectively:
- a first scanning sequence of the cells 111 of the buffer memory 11, used for writing the pixel values of the image strip 1 (FIG. 3a), also called first writing order of the cells 111;
- a second scanning order of the cells 111 of the buffer memory 11, used for reading the pixel values of the image strip 1 (FIG. 3b), also called first reading order of the cells 111;
- a third scanning order of the cells 111 of the buffer memory 11, used for writing the pixel values of the image strip 2 (FIG. 3c), also called second writing order of the cells 111; and
- a fourth scanning order of the cells 111 of the buffer memory 11, used for reading the pixel values of the image strip 2 (FIG. 3d), also called second reading order of the cells 111.

These scanning orders are illustrated in all these figures by arrow strings running though the buffer memory 11.

For the steps of writing pixel values into the buffer memory 11 (FIGS. 3a and 3c), the application output memory 10 is represented again on the left part of the figures for reminding that the pixels values which are loaded into the buffer memory 11 during these writing steps are always read from the application output memory 10 according to the application raster direction of FIG. 1a. The pixel values are read from the application output memory 10 and written into the buffer memory 11 one after another or using the burst mode.

In the steps of reading the pixel values from the buffer memory 11 (FIGS. 3b and 3d), the pixel values read are transferred stream-like to the display unit 12, and processed for displaying the image while assuming that the pixels values are ordered within the stream according to the screen raster direction.

For making clear the description of the invention implementation which is now provided as an example, the following notations are used: $S_{c,r}$ denotes the pixel 101 of the image strip S, which is located at the crossing of the c-th column and the r-th line or row in the application output memory 10. Hence S is a non-zero integer value successively equal to 1 (in FIGS. 3a and 3b), 2 (in FIGS. 3c and 3d), 3, 4 ..., c is a non-zero integer value from 1 to B, and r is another non-zero integer value from 1 to L.

Referring to FIG. 3a, the pixel values of the image strip 1 which are contained in the successive lines R of the application output memory 10 are copied to the columns of cells 111 of the buffer memory 11. Preferably, the columns of the buffer memory 11 are successively addressed to as copying moves progressively parallel to the column direction of the application output memory 10. But it is possible to move along each line of the buffer memory 11 using a cell writing order other than that of progressively increasing the column number within the buffer memory 11. In all cases, the image strip 1 is loaded into the buffer memory 11 while ensuring that the pixel values are read from the application output memory 10 according to the application raster direction.

Referring now to FIG. 3b, the pixel values thus contained in the buffer memory 11 are read successively along each line of this buffer memory, and then moving to the next line. The read order within each line is common to all lines of the buffer memory 11, and is the same as the addressing order of the buffer memory cells used in the writing step of FIG. 3a. Thus, the image strip 1 is transferred to the display unit 12 according to the screen raster direction of FIG. 1b.

The maximum time delay between the writing into one cell 111 of the buffer memory 11 and the reading from the same cell 111, over the whole buffer memory 11, can thus be as low as L times the duration of a base sequence comprising one cell-writing and one cell-reading into the buffer memory. Indeed, if the pixel value $1_{1,1}$ is read from the buffer memory 11 immediately after it has been written therein, then the pixel value $1_{2,1}$ is read after the first line of the buffer memory has been read completely in the mean time.

Turning now to FIG. 3c, the pixel values of the image strip 2 which are newly contained in the application output memory 10 are copied to the cells 111 of the buffer memory 11. The read order of these pixel values from the application output memory 10 is again that of the application raster direction. The arrow string with jumps forwards and returns which is represented above the buffer memory 11 in FIG. 3c indicates the addressing order of the cells 111 for writing the pixel values into the buffer memory 11. The cell 111 located at the crossing of the first column and the first line of the buffer memory 11 is used for writing the pixel value $2_{1,1}$ read at first. Starting from this cell, the pixel value $2_{2,1}$ read next from the application output memory 10 is written in the cell 111 which is shifted in position by the increment incr=S' along the first line of the buffer memory 11. Then, from this latter cell 111 containing the pixel value $2_{2,1}$, the increment S' is applied again along the first line of the buffer memory 11 for writing the pixel value $2_{3,1}$ read thereafter, etc. After the pixel value $2_{B,1}$ has been copied into the buffer memory 11 in this manner, the first pixel value $2_{1,2}$ of the second line R of the application output memory 10 is then copied to the cell 111 of the first line of the buffer memory 11, which is shifted in position by one cell along this first line with respect to the cell containing the $2_{1,1}$ pixel value. The increment S' along the first line of the buffer memory 11 is applied then again for each one of the pixel values of the second line R of the application output memory 10. Etc. The process in continued with a next line of the buffer memory 11 once the line currently used is completed. In this way, the distribution of the pixel values within the buffer memory 11 form successive separate groups $G_1, G_2, \ldots, G_B$ along the line direction of the buffer memory, B being again the image strip width. Each of these groups gathers S' successive columns of the buffer memory 11, and contains all the pixel values of one complete column C of the application output memory 10. Thus, group $G_1$ contains all the pixel values $2_{1,1}, 2_{1,2}, \ldots, 2_{1,L}$; group $G_2$ contains all the pixel values $2_{2,1}, 2_{2,2}, \ldots, 2_{2,L}$; etc. When L' is greater than L, the pixel values corresponding to row numbers from L+1 to L' in the application output memory 10 cannot be read from this latter as originating from the image strip currently handled. They may then be fixed arbitrarily, for example equal to zero, or no corresponding cell-writing may be executed into the buffer memory 11 provided that the corresponding buffer memory cells 111 dedicated to such non-existing pixel values are skipped.

Figure 3D:
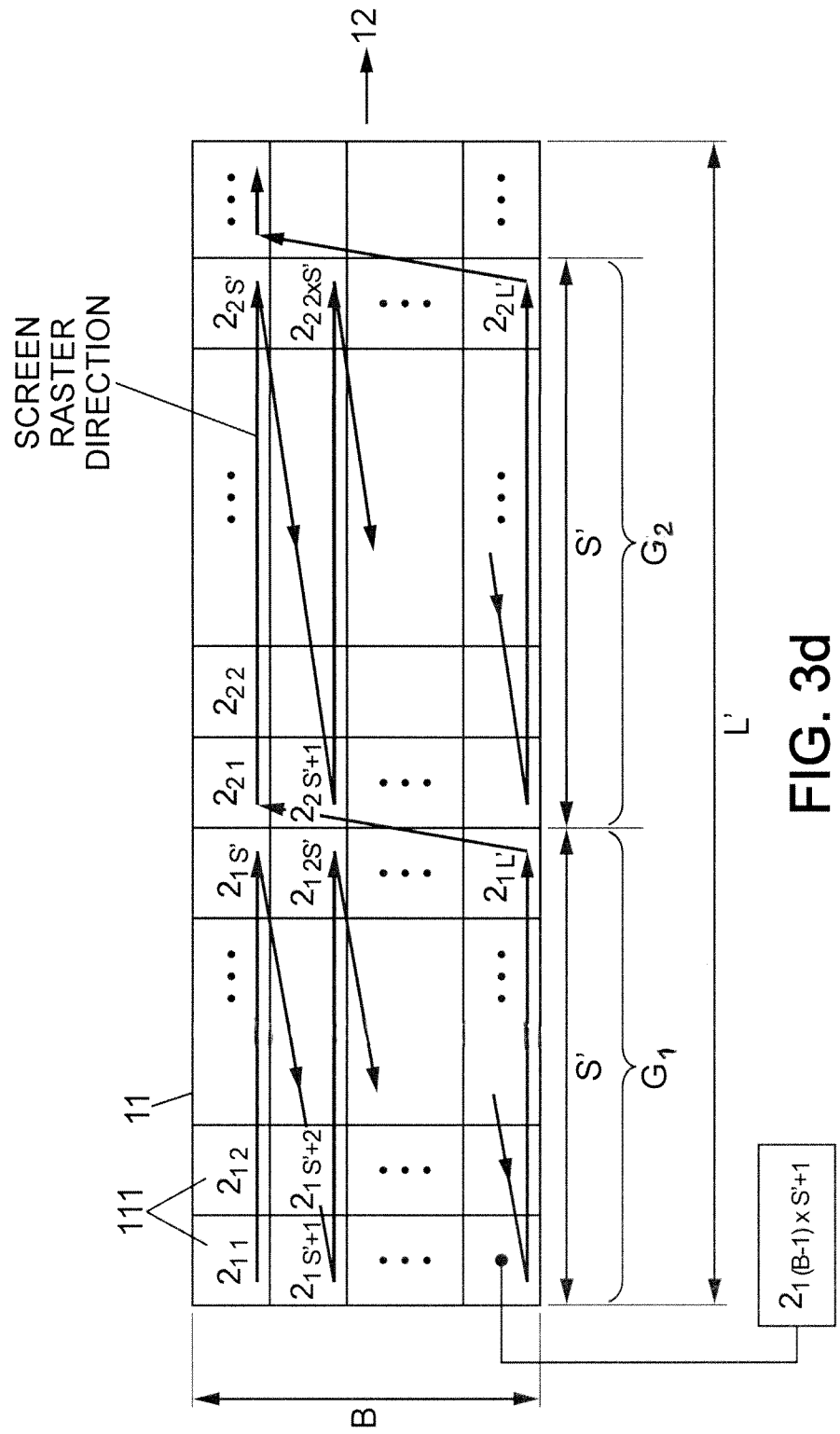

Then, the reading order into the buffer memory 11 for the pixel values of the image strip 2, as represented in FIG. 3d, is the same as that of FIG. 3b but limited within each group $G_1, G_2 \ldots, G_B$. Moving to a next group along the line direction of the buffer memory 11 is triggered once the pixel values of the preceding group have all been read. Thus, the image strip 2 is also transferred to the display unit 12 according to the screen raster direction.

Again for the pixel values of the image strip 2, the maximum time delay between the writing and the reading into one and same cell 111 of the buffer memory 11 can be as low as L' times the duration of a base sequence comprising one cell-writing and one cell-reading into the buffer memory.

The processing steps of FIGS. 3a and 3b can then be executed again but for the image strip 3, and steps of FIGS. 3c and 3d for the image strip 4 thereafter, and so on until the complete image 100 is transferred from the application output memory 10 to the display unit 12.

In such implementation of the invention method, the first and second writing orders (FIGS. 3a and 3c) and the second reading order (FIG. 3d) allows burst-handling of the pixel values because successive cell-writing and cell-reading operations involve adjacent cells in the application output memory 10 and/or in the buffer memory 11.

The Man skilled in the art will understand that details may be changed or adapted with respect to the invention implementation which has just been described with reference to the figures. In particular, the invention may be applied to images with any length and width expressed in pixel numbers, and partitioning the image into strips that are processed successively is not compulsory to the invention. Equivalently, one image corresponding to full display format may form by its own a single strip for implementing the invention. In addition, the order for addressing the columns and/or the lines of the buffer memory 11 may be changed for the steps of writing into this buffer memory, provided that corresponding changes are also introduced in the subsequent steps of reading from the buffer memory.

The invention claimed is:

1. A method for changing an image raster direction from an application raster direction to a screen raster direction which is perpendicular to the application raster direction, in-flight, while pixel values of an image are being transferred successively from an application output memory to a display unit, the image being divided into parallel image strips successively transferred, each image strip having a length direction perpendicular to the application raster direction, a strip length and a strip width expressed in pixel numbers, and each image strip being read from the application output memory according to the application raster direction and loaded into a buffer memory, and then transferred from said buffer memory to the display unit according to the screen raster direction, wherein a writing order is used for selecting cells of the buffer memory where the pixel values pertaining to a same image strip are written successively, and a reading order is used for selecting the cells of the buffer memory where the pixel values pertaining to a same image strip are read successively, said writing order and reading order being varied between two image strips transferred successively, the method comprising:

using a memory cell array as the buffer memory, with a buffer width at least equal to the strip width, and a buffer length at least equal to the strip length and to a multiple of the strip width; and using only two writing orders different from each other, and only two reading orders different from each other, the two writing orders being combined one-to-one and fixedly with the two reading orders for processing the image strips individually, and each of the two writing orders combined with the corresponding reading order being used in turn for image strips transferred successively.

2. The method according to claim 1, wherein a time duration between a writing operation of one pixel value into any one of the buffer memory cell and a later reading operation of said pixel value from the same buffer memory cell is less than a duration of a base sequence comprising one cell-writing and one cell-reading into the buffer memory multiplied by the strip length, when cell-writing and cell-reading into the buffer memory are executed in turn while the pixel values of the image are transferred from the application output memory to the display unit.

3. The method according to claim 1 wherein, assuming that the array of the buffer memory is arranged into lines each having the buffer length, and also into columns each having the buffer width, and each buffer memory cell being identified with a column number and a line number, and assuming that S' denotes a ratio of the image length to the image width, rounded-up to next integer:

in a first one of the two writing orders: the buffer memory cells are addressed to for writing the pixel values by moving first progressively along one and same first column of said buffer memory for the successive pixel values relating to one and same first image segment parallel to an image strip width direction, and then moving to a next buffer memory column adjacent to the first buffer memory column for writing the pixel values relating to a next image segment also parallel to the strip width direction and adjacent to the first image segment;

in the reading order which is combined with the first writing order for processing same image strips: the buffer memory cells are addressed to for reading the pixel values by moving first progressively along one and same first line of said buffer memory, and then moving to a next buffer memory line adjacent to said first buffer memory line;

in the second one of the two writing orders: the buffer memory cells are addressed to for writing the pixel values by moving first along one and same first line of said buffer memory together with shifting cell position by S' cells between two successive pixel values relating to one and same first image segment parallel to the image strip width direction, then repeating for the pixel values relating to a next image segment also parallel to the strip width direction and adjacent to the first image segment, using the same first line of the buffer memory but shifting the cell positions by one cell for each further image segment, and then moving to a next buffer memory line adjacent to the first buffer memory line for writing the pixel values relating to a further image segment also parallel to the strip width direction but shifted in position by S' pixels along the strip length direction with respect to the first image segment;

in the reading order which is combined with the second writing order for processing same image strips: the buffer memory cells are addressed to for reading the pixel values by moving first progressively along one and same first line of said buffer memory until the S'-th cell of said first buffer memory line, and then moving to a next buffer memory line adjacent to said first buffer memory line again until the S'-th of said next buffer memory line, then repeating for each buffer memory line and further repeating but back to the first buffer memory line while shifting in cell position by S' cells along a line direction.

4. The method according to claim 1 wherein, at least for the image strips processed using a fixed one of the writing orders, the pixel values are burst-read from the application output memory and burst-written into cells of the buffer memory.

5. The method according to claim 1 wherein, at least for the image strips processed using a fixed one of the reading orders, the pixel values are burst-transferred from the buffer memory to the display unit.

6. The method according to claim 1, wherein the buffer width equals the strip width, and the buffer length is a minimum multiple of the strip width, said multiple being also equal to or higher than the strip length.

7. An electronic device comprising:
a computing unit configured to output images when running an application, strips of each image being available from an application output memory in accordance with an application raster direction;
a display unit configured to be fed with image pixel values according to a screen raster direction;
a buffer memory comprised of a memory cell array, with a buffer width at least equal to a strip width, and a buffer length at least equal to a strip length and to a multiple of the strip width; and
a controller configured to implement a method according to claim 1.

8. The electronic device according to claim 7, wherein the buffer width equals the strip width, and the buffer length is the minimum multiple of the strip width also equal to or higher than the strip length.

9. The electronic device according to claim 7, wherein the buffer memory is silicon-embedded within an integrated circuit of the device.

10. The electronic device according to claim 9, wherein the controller is also silicon-embedded within the integrated circuit.

11. The electronic device according to claim 7, configured to trigger a change of the image raster direction automatically upon detection of a change in an orientation of the electronic device.

12. The electronic device according to claim 7, forming one of a mobile phone, a tablet, and a portable videogame console.

* * * * *